(12) United States Patent
Khesin

(10) Patent No.: US 9,054,917 B2
(45) Date of Patent: Jun. 9, 2015

(54) SECURE MIGRATION OF VIRTUAL MACHINES

(75) Inventor: Oscar Khesin, San Jose, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/520,464

(22) PCT Filed: Mar. 8, 2012

(86) PCT No.: PCT/US2012/028333
§ 371 (c)(1),
(2), (4) Date: Jul. 3, 2012

(87) PCT Pub. No.: WO2013/133842
PCT Pub. Date: Sep. 12, 2013

(65) Prior Publication Data
US 2013/0238786 A1    Sep. 12, 2013

(51) Int. Cl.
*G06F 15/173* (2006.01)
*H04L 29/08* (2006.01)
*G06F 9/455* (2006.01)
*H04L 29/06* (2006.01)

(52) U.S. Cl.
CPC .......... *H04L 29/08099* (2013.01); *G06F 9/455* (2013.01); *H04L 67/34* (2013.01); *H04L 67/18* (2013.01); *H04L 63/14* (2013.01); *G06F 9/45558* (2013.01); *G06F 2009/4557* (2013.01); *G06F 2009/45587* (2013.01)

(58) Field of Classification Search
CPC ... G06F 9/455; H04L 29/08099; H04L 67/18; H04L 67/34

USPC .......................................... 709/223–224, 220
See application file for complete search history.

(56) References Cited

U.S. PATENT DOCUMENTS

| | | | |
|---|---|---|---|
| 2007/0283348 A1* | 12/2007 | White | 718/1 |
| 2009/0276771 A1 | 11/2009 | Nickolov et al. | |
| 2010/0242045 A1* | 9/2010 | Swamy et al. | 718/104 |
| 2010/0332657 A1* | 12/2010 | Elyashev et al. | 709/226 |
| 2011/0023048 A1 | 1/2011 | Srinivasan | |
| 2011/0029651 A1 | 2/2011 | Snyder et al. | |
| 2011/0099548 A1* | 4/2011 | Shen et al. | 718/1 |
| 2011/0126197 A1 | 5/2011 | Larsen et al. | |
| 2011/0179111 A1 | 7/2011 | Ravichandran et al. | |
| 2011/0179175 A1 | 7/2011 | Ravichandran et al. | |

(Continued)

OTHER PUBLICATIONS

Berger et al., "vTPM: Virtualizing the Trusted Platform Module," USENIX Association, Security '06: Proceedings of the 15th conference on USENIX Security Symposium, 2006, 15(21), 305-320.

(Continued)

*Primary Examiner* — Philip B Tran
(74) *Attorney, Agent, or Firm* — Dorsey & Whitney LLP

(57) ABSTRACT

Technologies are generally described for the secure live migration of virtual machines. The migration may take place in the context of, for example, public clouds. In various embodiments, by using a hidden process incorporated in a virtual machine's kernel and a trusted wireless and/or wired positioning service, a cloud provider and/or cloud user may be alerted about possible virtual machine hijacking/theft. The provider or user may also be provided with an approximate physical location of the platform running the compromised virtual machine for further investigation and enforcement measures.

19 Claims, 9 Drawing Sheets

(56) References Cited

U.S. PATENT DOCUMENTS

| | | | |
|---|---|---|---|
| 2011/0213765 | A1 | 9/2011 | Cui et al. |
| 2012/0036515 | A1* | 2/2012 | Heim ............................ 718/105 |
| 2012/0054367 | A1 | 3/2012 | Ramakrishnan |
| 2012/0084445 | A1* | 4/2012 | Brock et al. .................. 709/226 |
| 2012/0096459 | A1* | 4/2012 | Miyazaki ...................... 709/226 |
| 2012/0173757 | A1* | 7/2012 | Sanden ......................... 709/238 |
| 2012/0266163 | A1* | 10/2012 | Durham et al. ................... 718/1 |
| 2012/0311568 | A1* | 12/2012 | Jansen .............................. 718/1 |
| 2013/0007734 | A1* | 1/2013 | McCloy ............................ 718/1 |
| 2013/0097296 | A1* | 4/2013 | Gehrmann et al. ........... 709/223 |
| 2013/0138764 | A1* | 5/2013 | Satapathy ..................... 709/214 |
| 2013/0198352 | A1* | 8/2013 | Kalyanaraman et al. ..... 709/223 |

OTHER PUBLICATIONS

Brambley, R., "Virtual Machine Sniffer on ESX Hosts," VM /ETC, http://vmetc.com/2009/03/12/virtual-machine-sniffer-on-esx-hosts/, Mar. 12, 2009, 4 pages.

Cloud Security Alliance (CSA), "Security Guidance for Critical Areas of Focus in Cloud Computing V2.1," Dec. 2009, 1-76.

Cloud Security Alliance (CSA), "Top Threats to Cloud Computing V1.0," Mar. 2010, 1-14.

Das et al., "Albatross: Lightweight Elasticity in Shared Storage Databases for the Cloud using Live Data Migration," Proceedings of the VLDB Endowment, May 2011, 4(8), 494-505.

Harsh, M., "Security issues with Cloud Computing," The Windows Club, http://www.thewindowsclub.com/security-issues-with-cloud-computing, Jan. 30, 2011, 3 pages.

Hill et al., "Building a Trusted Location Service for Pervasive Computing Environments," Indiana Univeristy, U.S.A., May 2007, 1-6.

International Patent Application No. PCT/US2012/28333: International Search Report and Written Opinion dated Jun. 4, 2012, 7 pages.

Ishakian et al., "Colocation as a Service: Strategic and Operational Services for Cloud Colocation," 2010 Ninth IEEE International Symposium on Network Computing and Applications, Jul. 15-17, 2010, 76-83.

Mateti, P., "Hacking Techniques in Wireless Networks," Wright State University, Department of Computer Science and Engineering, http://www.cs.wright.edu/~pmateti/InternetSecurity/Lectures/WirelessHacks/Mateti-WirelessHacks.htm, Date Accessed Nov. 28, 2011, 17 pages.

Midnight Research Labs, "(Script to) Locate Any WiFi Router by its MAC Address," http://midnightresearch.com/pages/locate-any-wifi-router-by-its-mac-address/, Jun. 18, 2010, 3 pages.

Murray et al., "Improving Xen Security through Disaggregation," VEE '08 Proceedings of the fourth ACM SIGPLAN/SIGOPS international conference on Virtual execution environments, Mar. 5-7, 2008, 151-160.

Quynh, N. A., "DeepSec 2007: Hijacking Virtual Machine Execution for Fun and Profit," http://www.youtube.com/watch?v=RtXJx2qaVyc, Date Accessed Dec. 28, 2011, 3 pages.

Santos et al., "Towards Trusted Cloud Computing," HotCloud'09 Proceedings of the 2009 conference on Hot topics in cloud computing, 2009, Article No. 3, 5 pages.

Steele, C., "Virtual machine migration FAQ: Live migration, P2V and more," TechTarget Search Server Virtualization, http://searchservervirtualization.techtarget.com/feature/Virtual-machine-migration-FAQ-Live-migration-P2V-and-more, Aug. 2010, 3 pages.

"Location Technology," accessed at https://web.archive.org/web/20120226165314/http://www.skyhookwireless.com/, accessed on Jan. 6, 2015, pp. 1-2.

"AirMagnet WiFi Analyzer," accessed at https://web.archive.org/web/20111217033607/http://www.flukenetworks.com/enterprise-network/wireless-network/AirMagnet-WiFi-Analyzer, accessed on Jan. 6, 2014, p. 5.

* cited by examiner

SECURE MIGRATION OF VIRTUAL MACHINES

CROSS-REFERENCE TO RELATED APPLICATIONS

This application is the National Stage filing under 35 U.S.C §371 of International Application No. PCT/US2012/028333, filed Mar. 8, 2012, the disclosure of which is incorporated herein by reference.

BACKGROUND

Cloud computing refers to a computing environment for enabling on-demand network access to a shared pool of computing resources. Many cloud computing services involve virtualized resources and may take the form of web-based tools or applications that users can access and use through a web browser as if they were programs installed locally on their own computers. The data stored for users of such systems are typically hosted in computing systems located in a computing data center. The location for such a data center may be selected to provide easy access to the data from the users of the remote presentation system.

One benefit of server virtualization technology in cloud computing is virtual machine migration. The ability to migrate a virtual machine from one physical host to another can significantly boost a company's disaster recovery efforts and improve business agility. Migration may also be useful when an administrator needs to shut down a physical server for maintenance or upgrades because such server downtimes no longer result in application downtime.

Virtual machine live migration allows for the migration of a virtual machine from one physical host to another without significantly interrupting application availability. Live migration may involve capturing a virtual machine's complete memory state and the state of all its processor registers and sending that data to memory space on another server. That server may then load the processor registers, and the virtual machine can pick up where it left off.

However, when users and administrators do not follow virtualization best practices for virtual machine migration, the virtual machine infrastructure can be susceptible to security risks. For example, migrating a virtual machine with customer credit card data to a host that also runs a public web server may violate the Payment Card Industry Data Security Standard. Without having a proper change management system in place, virtual machine migration can also violate corporate policies. When a virtual machine is migrated, management software, provisioning software, and integrated process management tools can help address such security and compliance concerns.

Such concerns include account or service hijacking, phishing, fraud, and exploitation of software vulnerabilities. Credentials and passwords are often reused, which amplifies the impact of such attacks. Cloud services add a new threat to the landscape. For example, if an attacker gains access to user/administrator credentials, the attacker can eavesdrop on user/administrator activities and transactions, manipulate data, return falsified information, and redirect user clients to illegitimate sites. User account or service instances may then become a new base for the attacker. From there, attackers can leverage the power of user reputation to launch subsequent attacks.

SUMMARY

Disclosed herein are methods and systems for the secure live migration of virtual machines in public clouds. The migration may take place in the context of, for example, public clouds. In various embodiments, by using a hidden process incorporated in a virtual machine's kernel and a trusted wireless and/or wired positioning service, a cloud provider and/or cloud user may be alerted about possible virtual machine hijacking/theft. The provider or user may also be provided with an approximate physical location of the platform running the compromised virtual machine for further investigation and enforcement measures.

In some embodiments, a method for migrating a virtual machine may include receiving a request to migrate a virtual machine from a source host to a target host. In an embodiment, it may be determined whether the geographic location of the target host is within a predetermined perimeter. The determining may be based on location information received from a positioning service. Based on the determination, the migration of the virtual machine to the target host may be allowed or denied.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
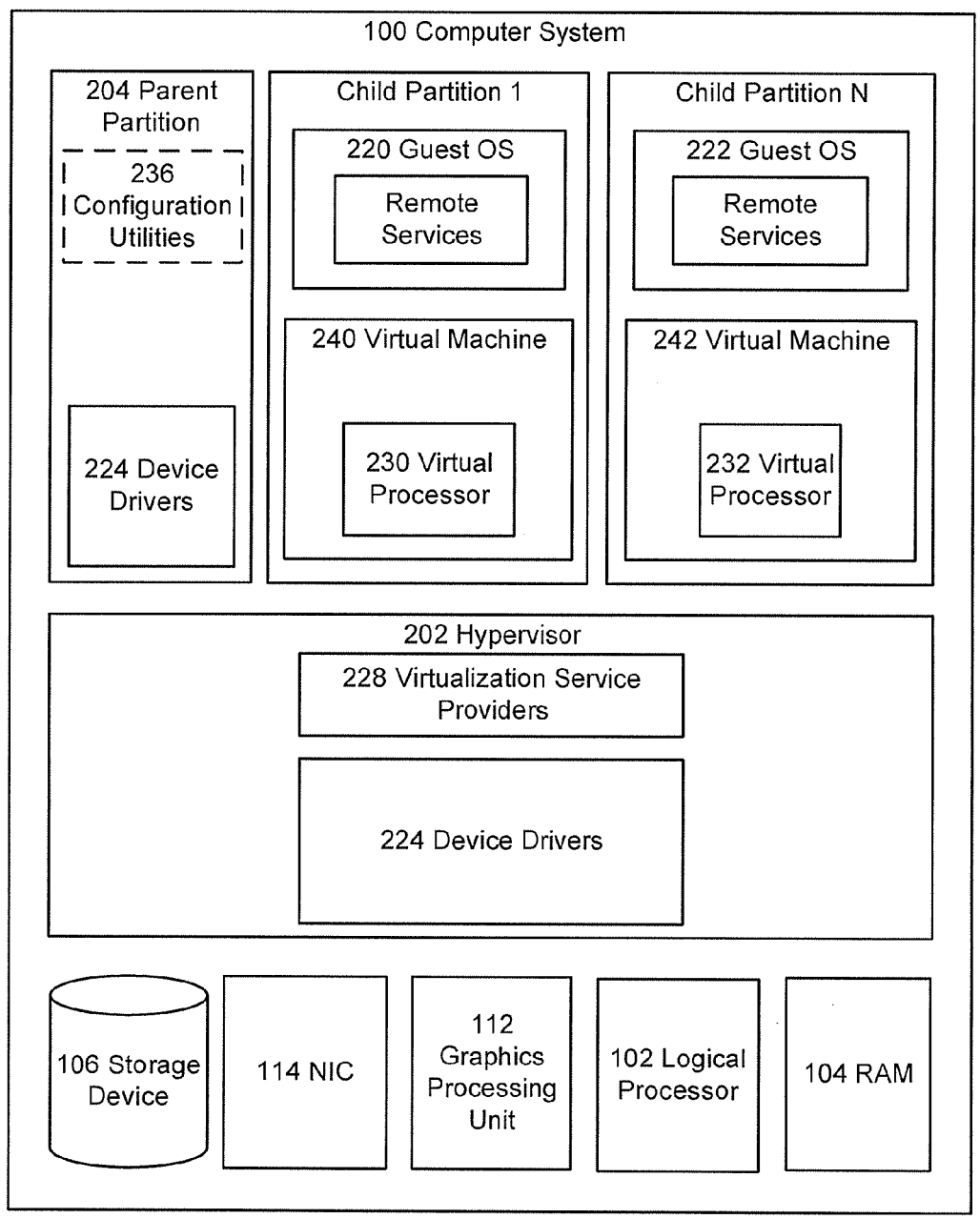
FIG. 1 depicts an example computing environment wherein aspects of the present disclosure can be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 1 depicts an example computing environment wherein aspects of the present disclosure can be implemented. In particular, FIG. 1 and the following description are intended to provide a brief, general description of an example virtual computing environment in which the embodiments described herein may be implemented. Referring to FIG. 1, a computer system 100 includes a parent partition 204. Parent partition 204 can be configured to provide resources to guest operating systems executing in child partitions 1 through N by using virtualization services. Each child partition 1 through N can include one or more virtual processors such as virtual processors 230 through 232 that guest operating systems 220 through 222 can manage and schedule threads to execute thereon. Generally, virtual processors 230 through 232 may be executable instructions and associated state information that provide a representation of a physical processor with a specific architecture. For example, one virtual machine may have a virtual processor having characteristics of an Intel x86 processor, whereas another virtual processor may have the characteristics of a PowerPC processor. Virtual processors 230 through 232 in this example can be mapped to logical processor 102 of computer system 100 such that the instructions that effectuate virtual processors 230 through 232 are mapped to and/or executed by logical processor 102. Thus, in these example embodiments, multiple virtual processors can be simultaneously executing while, for example, another logical processor is executing virtualization system instructions. Generally speaking, and as illustrated by the figure, the combination of virtual processors and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to privileged processor instructions. Each guest operating system 220 through 222 can have associated file systems that can have applications stored thereon such as terminal servers, e-commerce servers, email servers, etc., or the guest operating systems themselves. Guest operating systems 220 through 222 can schedule threads to execute on virtual processors 230 through 232 and instances of such applications can be effectuated.

Figure 2:
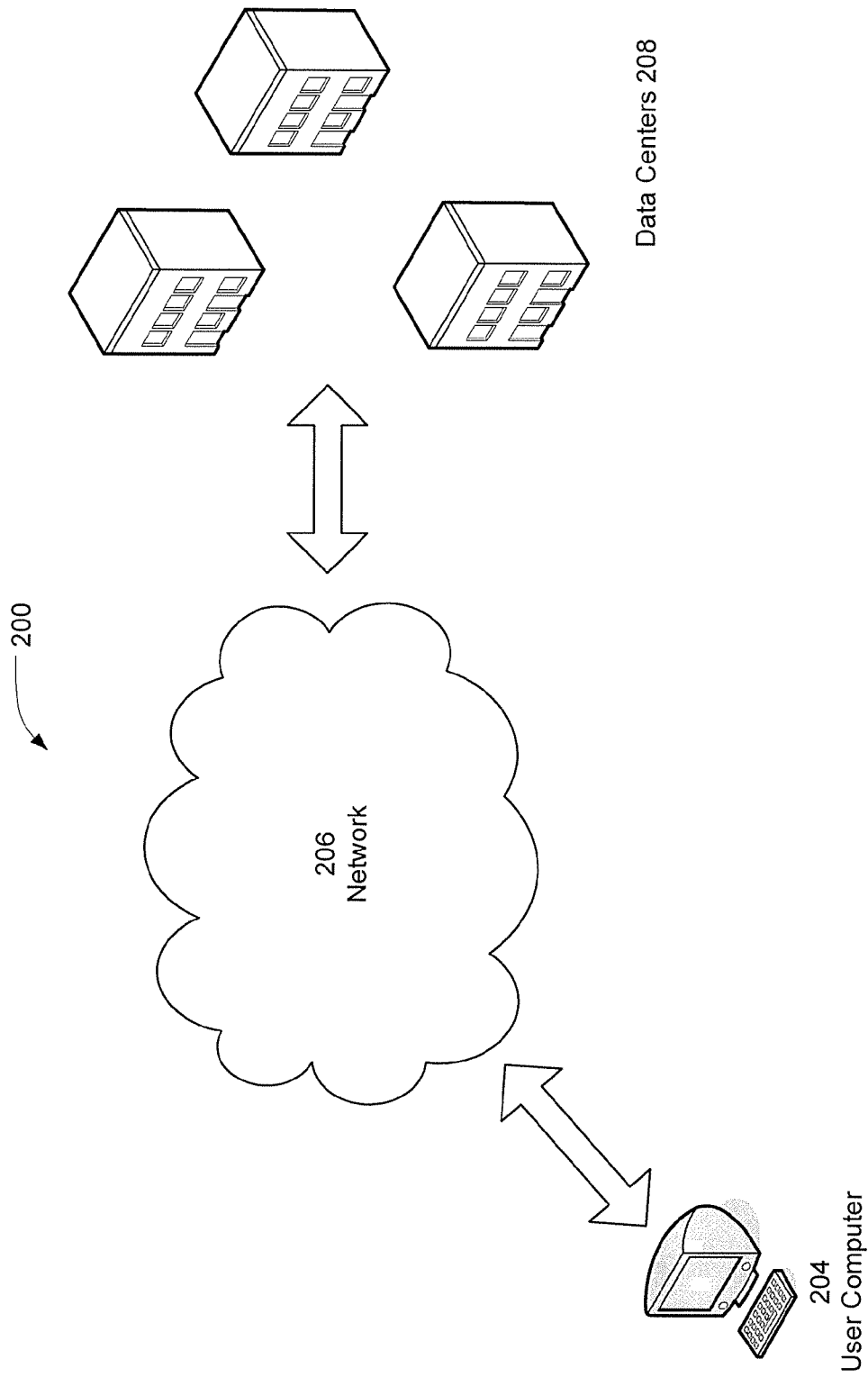
FIG. 2 depicts an example computing environment wherein aspects of the present disclosure can be implemented.

FIG. 2 depicts an example computing environment wherein aspects of the present disclosure can be implemented. In particular, FIG. 2 depicts an illustrative operating environment 200 that includes data centers 208 for providing computing resources. Data centers 208 can provide computing resources for executing applications and providing data services on a continuous or an as-needed basis. The computing resources provided by data centers 208 may include various types of resources, such as data processing resources, data storage resources, data communication resources, and the like. In some embodiments, the data processing resources may be available as virtual machine instances. The virtual machine instances may be configured to execute applications, including Web servers, application servers, media servers, database servers, and the like. Data storage resources may include file storage devices, block storage devices, and the like. The data center may include resources other than virtual machine computing resources, including a number of physical computing devices that can be configured to run one or more virtual machines that can be migrated across the physical resources for load balancing.

The computing resources provided by data centers 208 may be enabled by one or more individual data centers. Data centers 208 may be facilities utilized to house and operate computer systems and associated components. Data centers 208 may include redundant and backup power, communications, cooling, and security systems. Data centers 208 may also be located in geographically disparate locations.

The customers and other consumers of data centers 208 may access the computing resources provided by data centers 208 over a network 206. It should be appreciated that a local-area network ("LAN"), the Internet, or any other networking topology known in the art that connects data centers 208 to remote consumers may be utilized. It should also be appreciated that combinations of such networks might also be utilized.

A user computer 204 may be a computer utilized by a customer or other consumer of data centers 208. For instance, user computer 204 may be a server computer, a desktop or laptop personal computer, a thin client, a tablet computer, a wireless telephone, a personal digital assistant ("PDA"), an e-reader, a game console, or any other computing device capable of accessing data centers 208.

User computer 204 may be utilized to configure aspects of the computing resources provided by data centers 208 or access services provided by data centers 208. For example, data centers 208 may provide a Web interface through which aspects of its operation may be configured or accessed through the use of a Web browser application program executing on user computer 204. Alternatively, a stand-alone application program executing on user computer 204 might access an application programming interface ("API") exposed by data centers 208 for accessing the computing resources or performing the configuration operations. Other mechanisms for configuring the operation of data centers 208, including deploying updates to an application or accessing the computing resources might also be utilized.

Figure 3:
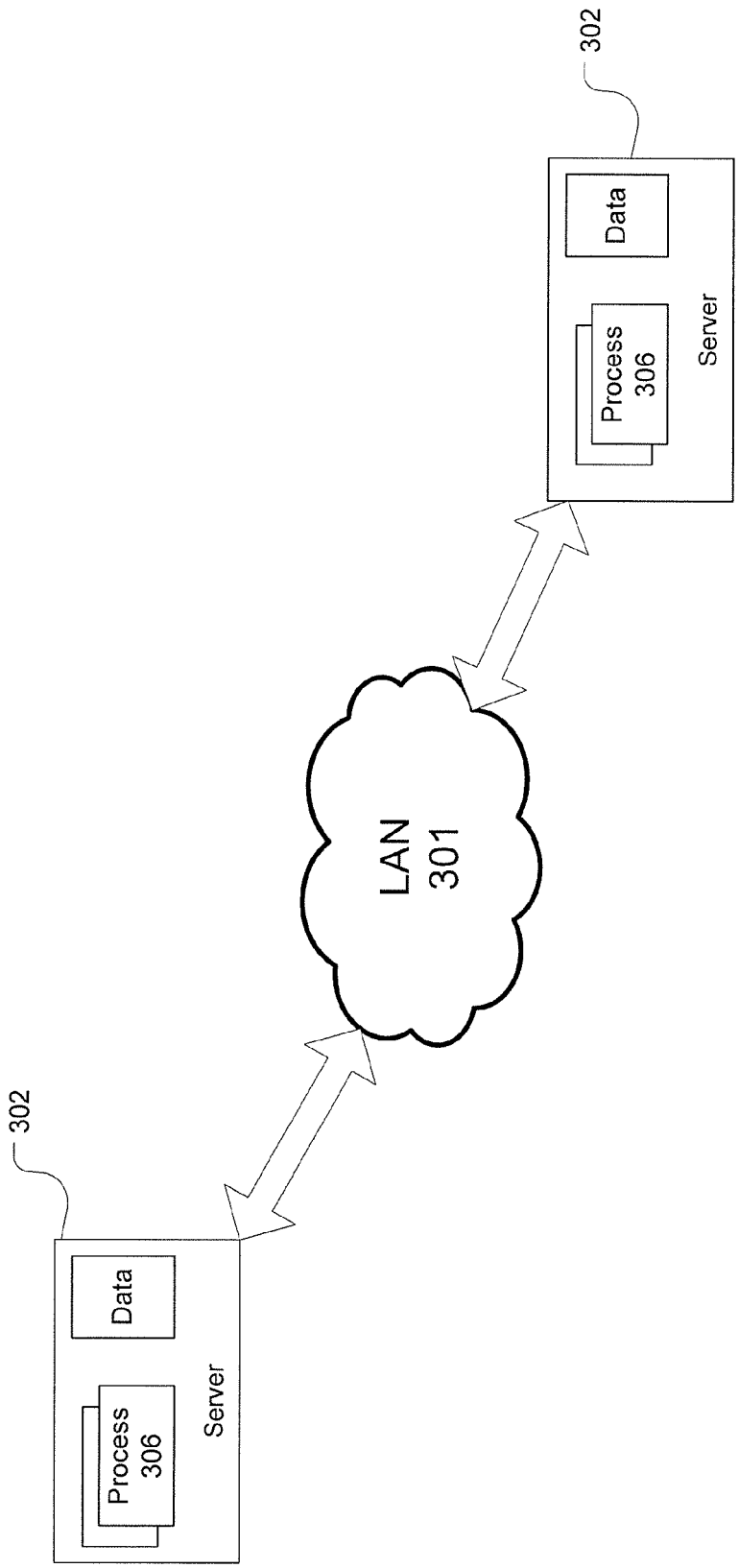
FIG. 3 depicts an example computing environment wherein aspects of the present disclosure can be implemented.

FIG. 3 depicts an example computing environment wherein aspects of the present disclosure can be implemented. As depicted, FIG. 3 shows server computers 302 for providing computing resources for executing an application. Server computers 302 may comprise general purpose computers configured appropriately for providing the computing resources described above. For instance, in one implementation, server computers 302 may be configured to provide processes 306.

In one embodiment, processes 306 may be virtual machine instances. A virtual machine instance may be an instance of a software implementation of a machine (i.e., a computer) that executes programs much like a physical machine that executes programs. In the example of virtual machine instances, each of servers 302 may be configured to execute a virtualization manager capable of executing the instances. The virtualization manager might be a hypervisor or another type of virtualization program configured to enable the execution of processes 306 on servers 302, for example.

It should be appreciated that although some of the embodiments disclosed herein are discussed in the context of virtual machine instances, other types of instances can be utilized with the concepts and technologies disclosed herein. For example, the technologies disclosed herein might be utilized with instances of storage resources, processing resources, data communications resources, and with other types of resources. The embodiments disclosed herein might also be utilized with computing systems that do not utilize virtual machine instances, i.e., that use a combination of physical machines and virtual machines.

In the example data center shown in FIG. 3, a LAN 301 is utilized to interconnect server computers 302. It should be appreciated that the network topology illustrated in FIG. 3 has been simplified and that many more networks and networking devices may be utilized to interconnect the various computing systems disclosed herein. Appropriate load balancing devices or software modules might also be utilized for balancing a load between data centers, between each of server computers 302 in a data center, and between processes 306. These network topologies and devices should be apparent to those skilled in the art.

Cloud computing generally refers to a computing environment for enabling on-demand network access to a shared pool of computing resources (e.g., applications, servers, and storage) such as those described above. Such a computing environment may be rapidly provisioned and released with minimal management effort or service provider interaction. Cloud computing services typically do not require end-user knowledge of the physical location and configuration of the system that delivers the services. The services may be consumption-based and delivered via the Internet. Many cloud computing services involve virtualized resources such as those described above and may take the form of web-based tools or applications that users can access and use through a web browser as if they were programs installed locally on their own computers.

Cloud computing services are typically built on a suitable computing platform. For some applications, such as those running inside an organization's data center, this platform may include an operating system and a data storage service configured to store data. Applications running in the cloud may utilize a similar platform.

Figure 4:
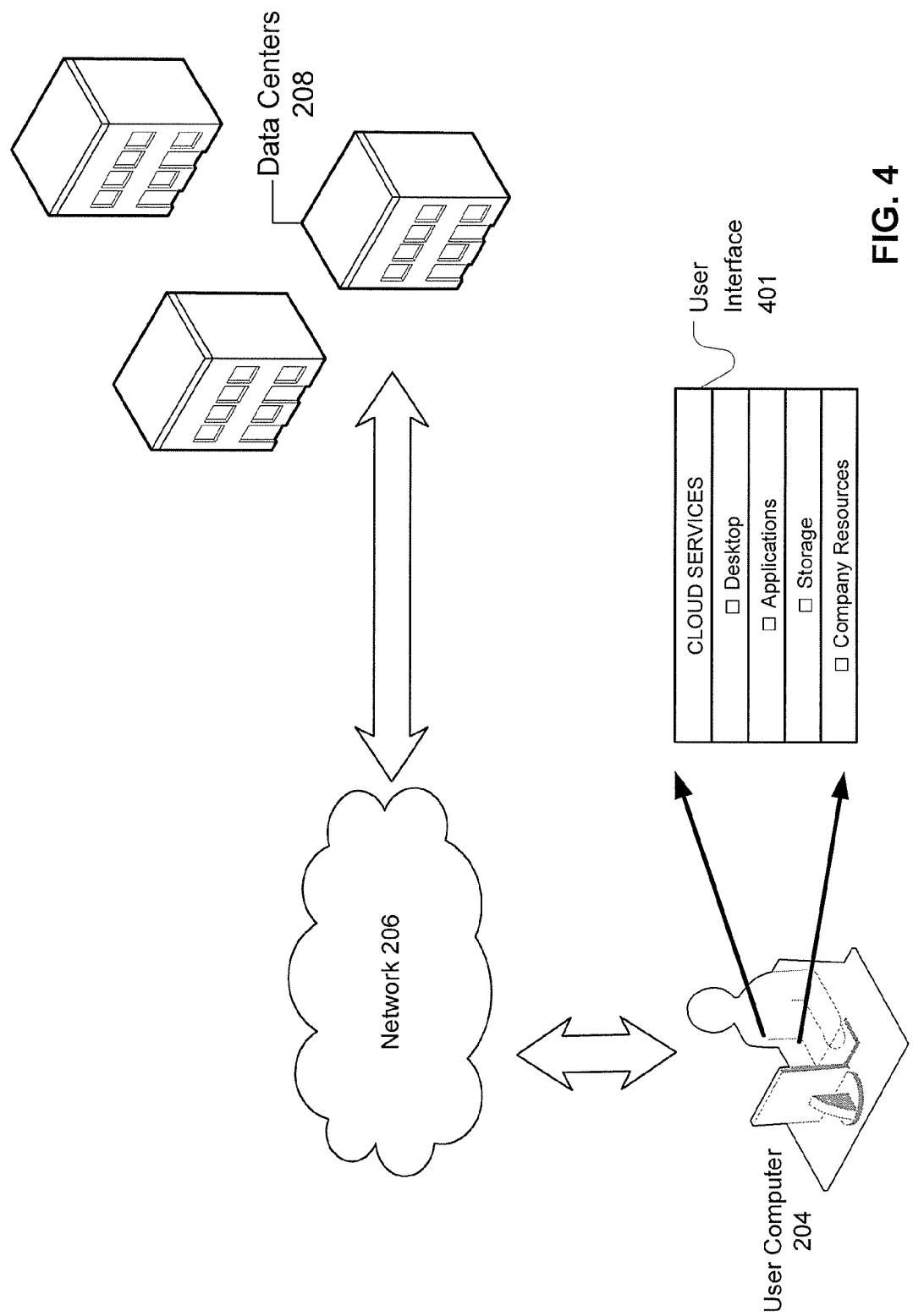
FIG. 4 depicts an example operational environment for practicing aspects of the present disclosure.

FIG. 4 depicts an example operational environment for practicing aspects of the present disclosure. In particular, FIG. 4 provides further detail to the example environment shown in FIG. 3. A user at user computer 204 can access cloud computing services hosted in data centers 208 via network 206 and using a user interface 401. For example, user interface 401 may comprise a web interface through which the cloud computing services can be accessed. The user may access services such as a remote desktop, applications, and storage services. The user may also access the user's company resources that are hosted by the cloud computing services. The provider of the cloud computing services can charge a fee to the user for providing the requested services. The cloud computing services may also be configured by an administrator that configures the cloud computing services to be provided to a defined group of users such as employees of a company that provides authentication credentials.

When users and administrators do not follow virtualization best practices for virtual machine migration, the virtual machine infrastructure can be susceptible to security risks. For example, migrating a virtual machine with customer credit card data to a host that also runs a public web server may violate the Payment Card Industry Data Security Standard. Without having a proper change management system in place, virtual machine migration can also violate corporate policies. When a virtual machine is migrated, management software, provisioning software, and integrated process management tools can help address such security and compliance concerns.

Such concerns can include account or service hijacking, phishing, fraud, and exploitation of software vulnerabilities. Credentials and passwords are often reused, which amplifies the impact of such attacks. Cloud computing services add a new threat to the landscape. For example, if an attacker gains access to user/administrator credentials, the attacker can eavesdrop on user/administrator activities and transactions, manipulate data, return falsified information, and redirect user clients to illegitimate sites. User account or service instances may become a new base for the attacker. From there, attackers can leverage the power of user reputation to launch subsequent attacks.

Hardware and software technologies that enable the construction and utilization of trusted platforms are generally described herein. In some embodiments, a trusted platform module (TPM) chip may be bundled with commodity hardware. The TPM may include an endorsement private key (EK)

that uniquely identifies the TPM and thus the physical host. The TPM may also include cryptographic functions that cannot be modified. The manufacturer can sign the corresponding public key to guarantee the correctness of the chip and validity of the key.

Trusted platforms may leverage the features of TPM chips to enable remote attestation. In some examples, at boot time, the host may compute a measurement list consisting of a sequence of hashes of the software involved in the boot sequence (e.g., the BIOS, the bootloader, and the software implementing the platform). The measurement list may be securely stored inside the host's TPM. To attest to the platform, a remote party may challenge the platform running at the host with a nonce (e.g., a sequence used to sign a cryptographic communication). The platform may request the local TPM to create a message containing both the measurement list and the nonce. The message may be encrypted with the TPM's private EK. The host may then send the message back to the remote party who may then decrypt the message using the EK's corresponding public key, thereby authenticating the host. By checking that the nonces match and that the measurement list corresponds to a configuration that is deemed to be trusted, a remote party can identify the platform on an untrusted host.

One problem is that during live migration of a virtual machine located in the cloud, the virtual machine can be hijacked and stolen as described above by a malicious administrator/insider or a hacker who has acquired administrator credentials. In such a case, the stolen virtual machine (or even the platform hardware itself) can be moved to unknown or unregistered physical locations within or outside of the geographical/jurisdiction perimeter authorized by the cloud provider and/or the service level agreement (SLA). The attacker may then start running the stolen virtual machine via the same virtual IP address using a proxy service that can be set up by the same malicious administrator/insider or a hacker at the original server location. The attacker can then extract confidential information, impersonate the cloud provider or user, and eventually damage their business reputation. Such malicious administrators/insiders can perform all of the above activities without the cloud provider's or cloud user's knowledge and with little chance of being caught, especially if the stolen virtual machine has been moved to other jurisdictions. The above risks can make companies hesitant to move to new cloud providers or even use cloud computing services at all.

In some embodiments, by using a hidden process incorporated in the virtual machine's kernel and a trusted wireless and/or wired positioning service, the cloud provider and/or cloud user may be alerted about possible virtual machine hijacking/theft and provided with an approximate physical location of the platform running the stolen virtual machine for further investigation and enforcement measures.

By helping to solve the above security issues, a greater level of security may be provided to cloud computing providers and additional assurances provided to cloud users who have been otherwise hesitant to use cloud computing services or move to new cloud providers.

Figure 5:
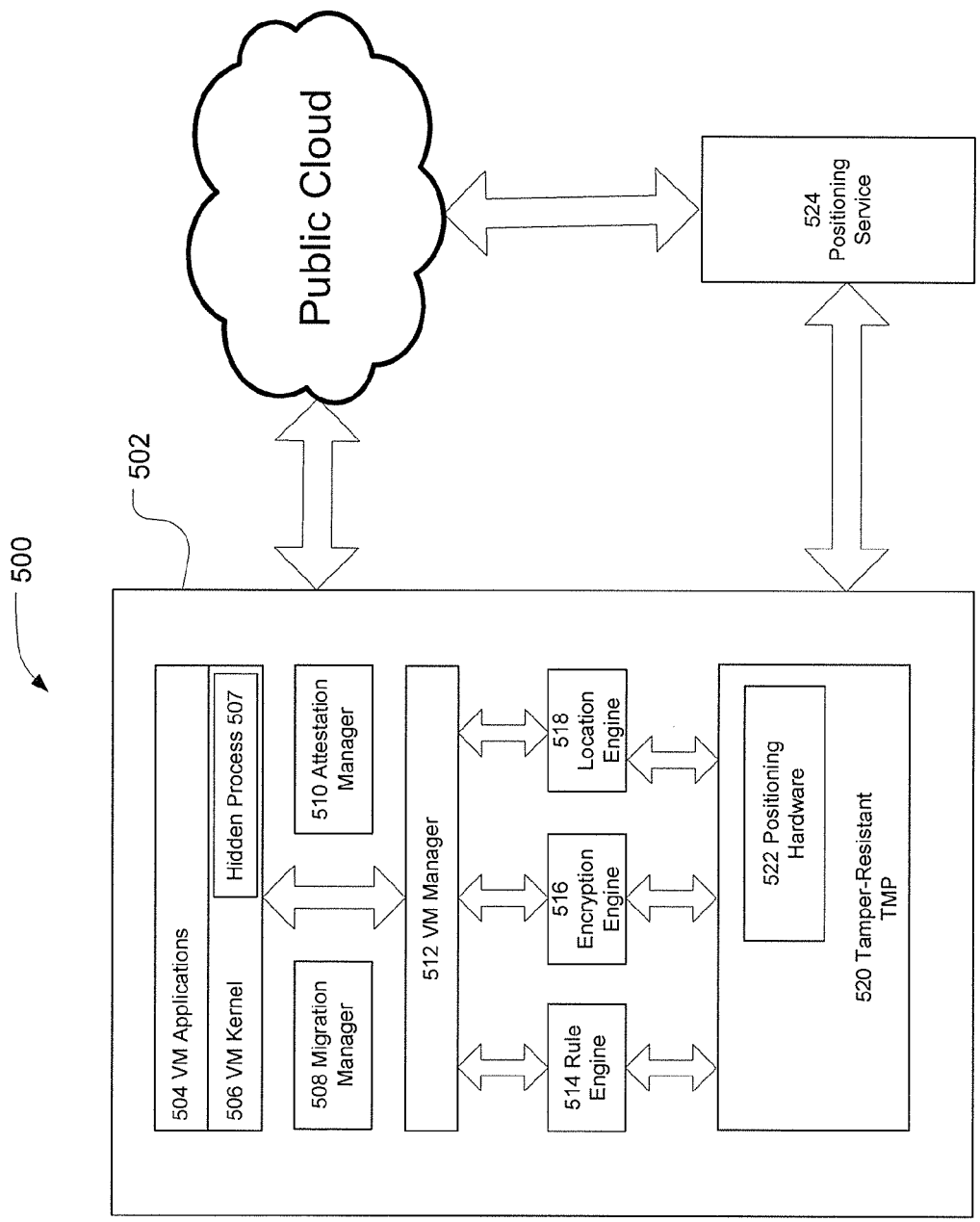
FIG. 5 illustrates an example system for migrating virtual machines.

FIG. 5 illustrates an example system for migrating virtual machines. In particular, FIG. 5 illustrates an example embodiment of a system 500 for the secure live migration of virtual machines in public clouds. A target host platform 502 may comprise a computing system as described herein that is configured to execute one or more virtual machines. As depicted, target host platform 502 may include VM applications 504, a VM kernel 506, a hidden process 507, a migration manager 508, an attestation manager 510, a VM manager 512, a rule engine 514, an encryption engine 516, a location engine 518, a tamper-resistant trusted platform module (TR-TMP) 520, and a positioning hardware 522.

VM applications 504 may include applications and services that are configured to execute on the VM. VM kernel 506 may be a core component of the VM operating system and configured to provide primary operating system functions such as resource management.

Hidden process 507 may be a virtual machine kernel level process which may be used to assist the target host verification process. For example, hidden process 507 may be configured to prevent execution of a virtual machine in situations in which a hacker has obtained an unauthorized copy of a virtual machine and is attempting to run the virtual machine on a hardware platform that has not incorporated positioning hardware 522 or does not have the proper hardware configuration as determined by TR-TMP 520. If a hacker manages to acquire the decryption key and attempts to execute the unauthorized virtual machine, hidden process 507 may check the hardware configuration and physical location in collaboration with positioning service 524.

In one embodiment, during initialization processing, hidden process 507 may start searching for wireless devices connected to target host platform 502 and trace their IP addresses in order to determine the physical location of the nearest wireless device. In the case of an incorrect configuration and/or unauthorized physical location, hidden process 507 may send an alert to the cloud provider and/or the cloud user about the possible hijacking/theft of the virtual machine and provide an approximate physical location of the platform running the stolen virtual machine for further investigation and enforcement measures. The approximate physical location may be based on information received from positioning hardware 522 and/or positioning service 524.

Migration manager 508 may be configured to control the virtual machine migration process including triggering the attestation process and requesting software/hardware upgrades if the target platform fails the attestation. Attestation manager 510 may be configured to cryptographically identify a target host to ascertain that the target host will properly run the virtual machine that is to be migrated. VM manager 512 may be configured to provide operating system management and protection of the runtime memory and storage.

Rule engine 514 may be configured to implement cloud provider rules and policies related to virtual machine migration. For example, rules and policies may be related to rights and credentials required to migrate virtual machines as well as the target host platforms' IDs and the physical locations allowed to run migrated virtual machines. Encryption engine 516 may be configured to encrypt data including generating a hash of the trusted boot OS with the private key stored in TR-TMP 520.

Location engine 518 may be configured to assist the attestation process by verifying that target host platform 502 is within the cloud provider's geographical/jurisdiction perimeter based on the geographical physical location information received from positioning hardware 522 and/or positioning service 524. The cloud provider's geographical/jurisdiction perimeter may be defined, for example, by country or region, radius from a defined location, a list of authorized devices, a geographic perimeter, or any other method for specifying allowable locations for a target host platform. If the verification process fails, target host platform 502 will not pass the attestation and the migrated virtual machine, which is not decrypted, will not be able to run on target host platform 502.

TR-TMP 520 may be configured to provide support for secure virtual machine migration to physical platforms in public clouds. For example, TR-TMP 520 may be configured to provide encryption functionality and store keys and other confidential information. TR-TMP 520 may ensure reliable attestation of the target physical platform (e.g., target host platform 502) where a virtual machine is to be migrated.

For example, TR-TMP 520 may include an endorsement private key that uniquely identifies TR-TMP 520 and thus the physical host. TR-TMP 520 may also include cryptographic functions that cannot be modified by a user. The hardware manufacturer can sign the corresponding public key to guarantee the correctness of the chip and validity of the key. In some embodiments, TR-TMP 520 may further include positioning hardware 522. By including positioning hardware 522 in TR-TMP 520, a hacker may be prevented from tampering or replacing positioning hardware 522 and thus providing a false position indication. In other embodiments, positioning hardware 522 may be separate from TR-TMP 520.

Positioning hardware 522 may comprise a device capable of providing location estimate information. For example, a Global Positioning System (GPS) receiver and/or a wireless adapter/router may be used. Positioning hardware 522 may allow positioning service 524 to determine the actual physical location of the target host platform 502.

Positioning hardware 522 may determine location estimates using a variety of position determination methods and systems including the Global Navigation Satellite System (GNSS), cellular-based location estimation, and manual data entry. GNSS systems may include any type of satellite-based navigation system that provides geo-spatial positioning including GPS, GLONASS, Beidou, COMPASS, and Galileo.

Positioning service 524 may be a wired or wireless positioning service. Positioning service 524 may be provided by the cloud provider or by an independent trusted service provider. In one embodiment, positioning service 524 can use data from Wi-Fi access points, GPS satellites, and cell towers to determine the best possible available location. In an embodiment, the device's location may be determined hierarchically, for example beginning with a coarse location estimate using GPS or cell towers and refining the initial estimate to arrive at a more precise estimate. Known locations of Wi-Fi access points may be used to further refine the position estimate.

Figure 6:
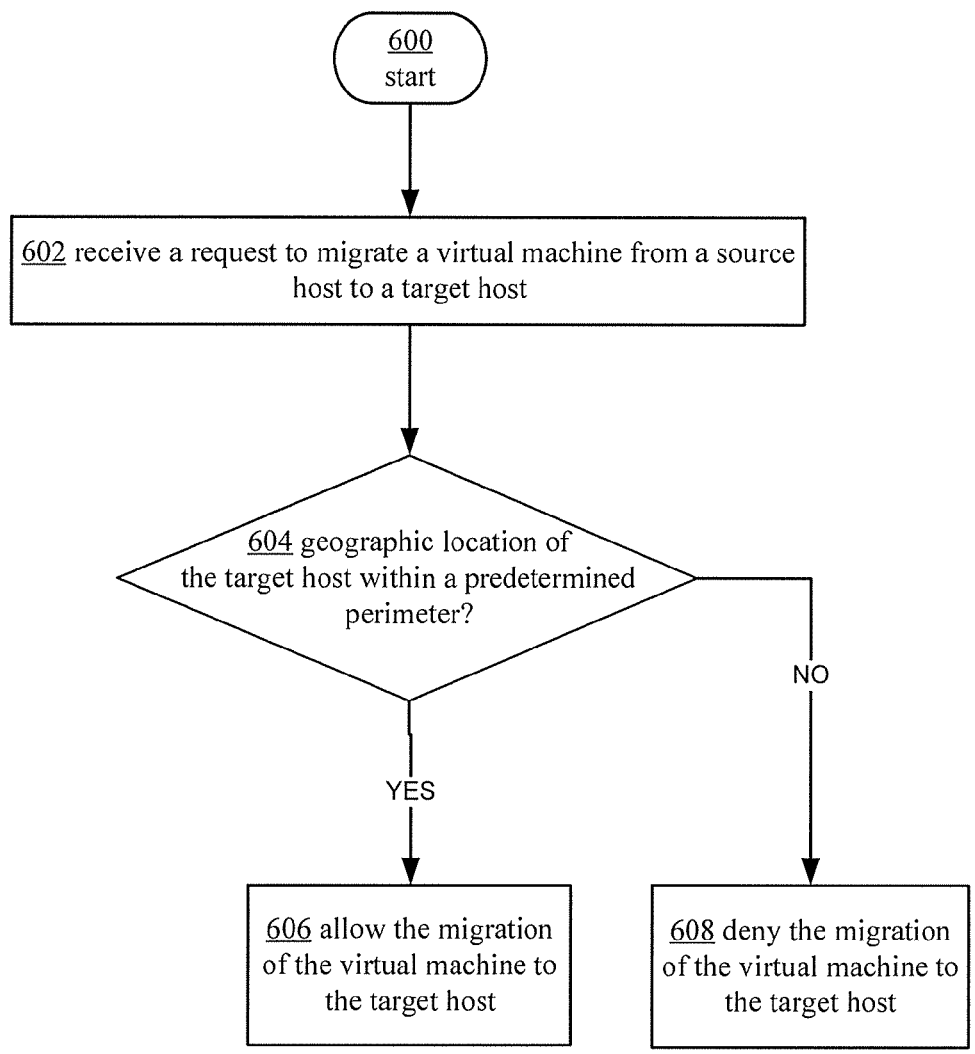
FIG. 6 illustrates an example of an operational procedure for migrating virtual machines.

FIG. 6 illustrates an example of an operational procedure for migrating virtual machines including operations 600, 602, 604, 606, and 608. In some embodiments, the operational procedure may be performed by a hidden process executing in the virtual machine. For example, hidden process 507 of FIG. 5 may execute in the virtual machine and may be configured to prevent execution of the virtual machine where a user is attempting to run the virtual machine on a hardware platform that has not incorporated positioning hardware 522 or does not have the proper hardware configuration as determined by TR-TMP 520.

Referring to FIG. 6, operation 600 begins the operational procedure. Operation 600 may be followed by operation 602. Operation 602 (receive a request to migrate a virtual machine from a source host to a target host) illustrates receiving, at a computing device, a request to migrate a virtual machine from a source host to a target host.

Operation 602 may be followed by operation 604. Operation 604 (geographic location of the target host within a predetermined perimeter?) illustrates determining whether a geographic location of the target host is within a predetermined perimeter. In one embodiment, the determination can be made based on location information received from a positioning service such as positioning service 524 described in FIG. 5. The positioning service may be, for example, a network based positioning service that determines location of devices based on IP or MAC addresses of network devices whose locations are known. In another embodiment, the positioning service may be a GPS based or cellular tower based positioning service.

If it is determined that the geographic location of the target host is within a predetermined perimeter, then operation 604 may be followed by operation 606. Operation 606 (allow the migration of the virtual machine to the target host) illustrates, based on the determining, allowing, by the computing device, the migration of the virtual machine to the target host. Otherwise, if it is determined that the geographic location of the target host is not within the predetermined perimeter, then, in some embodiments, operation 604 may be followed by operation 608. Operation 608 (deny the migration of the virtual machine to the target host) illustrates, based on the determining, denying, by the computing device, the migration of the virtual machine to the target host.

Figure 7:
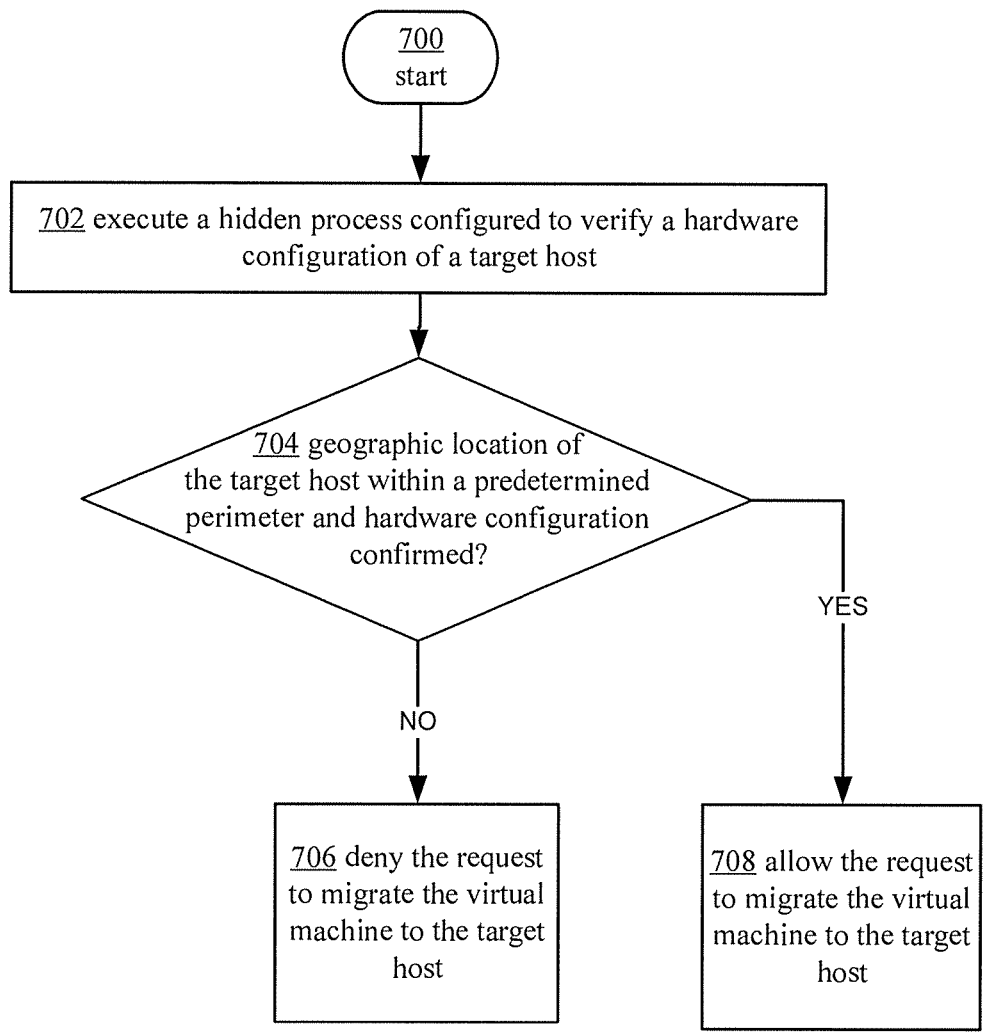
FIG. 7 illustrates an example of an operational procedure for migrating virtual machines.

FIG. 7 illustrates an example of an operational procedure for migrating virtual machines including operations 700, 702, 704, 706, and 708. Referring to FIG. 7, operation 700 begins the operational procedure. Operation 700 may be followed by operation 702. Operation 702 (execute a hidden process configured to verify a hardware configuration of a target host) illustrates execution of a hidden process configured to verify a hardware configuration of a target host. The hidden process may be incorporated in a kernel of the virtual machine. In one embodiment, the hidden process may be configured to communicate with a trusted platform module to receive information for verification of the hardware configuration. In some embodiments, the information comprises a hash of an operating system and a private key.

Operation 702 may be followed by operation 704. Operation 704 (geographic location of the target host within a predetermined perimeter and hardware configuration confirmed?) illustrates in response to a request to migrate a virtual machine from a source host to the target host, determining whether a geographic location of the target host is within a predetermined perimeter and whether the hardware configuration of the target host is verified. In one embodiment, the target host may include a trusted platform module (TPM) chip that contains an endorsement private key (EK) uniquely identifying the target host. In one embodiment, the hidden process may compute a measurement list including hashes of software involved in the boot sequence. The TPM chip may send a message containing both the measurement list and a nonce provided by the cloud service provider. The message may be encrypted with the TPM chip's private EK. The cloud service provide may then decrypt the message using the private EK's corresponding public key and verify that the nonce is correct and that the measurement list corresponds to a configuration that is deemed to be trusted.

The predetermined perimeter may include a radius from a geographic point, recognizing that users may change locations of hosts from time to time or move virtual machines to various hosts within a geographic area. In some embodiments, the predetermined perimeter may include a plurality of regions that may be acceptable locations for hosts. The predetermined perimeter may also be an entire country or region.

In one embodiment, the determination whether a geographic location of the target host is within a predetermined perimeter may comprise searching for network devices connected to the target host and determining the physical location by tracing IP addresses. For example, various public and private databases store locations of Wifi hotspots and other network devices, thus allowing for the tracing of nearby network devices through analysis of message traffic. In some embodiments a record of hopped IP addresses may be recorded for later retrieval, or sent along with an alert to aid enforcement and investigation activities as described herein.

Operation 704 may be followed by operation 706. Operation 706 (deny the request to migrate the virtual machine to the target host) illustrates denying the request to migrate the virtual machine to the target host. The denying can be based on determining whether the geographic location of the target host is within the predetermined perimeter and verification of the hardware configuration. If it is determined, based on the location determination, that the target host appears to be located outside of the predetermined perimeter, then the request to migrate the virtual machine may be denied. Additionally, the failure to verify the configuration of the target host may also be used to determine that the request to migrate the virtual machine should be denied. Otherwise, if it is determined that the geographic location of the target host is within the predetermined perimeter, then in some embodiments, operation 704 may be followed by operation 708. Operation 708 (allow the request to migrate the virtual machine to the target host) illustrates, based on the determining, allowing the migration of the virtual machine to the target host.

In some embodiments, the geographic location may be determined based on information received from a network device. Alternatively, the geographic location may be determined based on information provided by a geolocation device.

In some embodiments, an alert indicating denial of the request may be sent to the user, service provider, or a selected or predetermined third party such as an enforcement agency. The alert may include an indication of the geographic location of the denied host based on one or more of the methods described herein. In one embodiment, the alert may comprise an electronic mail message that includes the best known location of the host attempting to execute the virtual machine and other information that may be useful for tracking and enforcement measures such as a time logged history of user actions.

Figure 8:
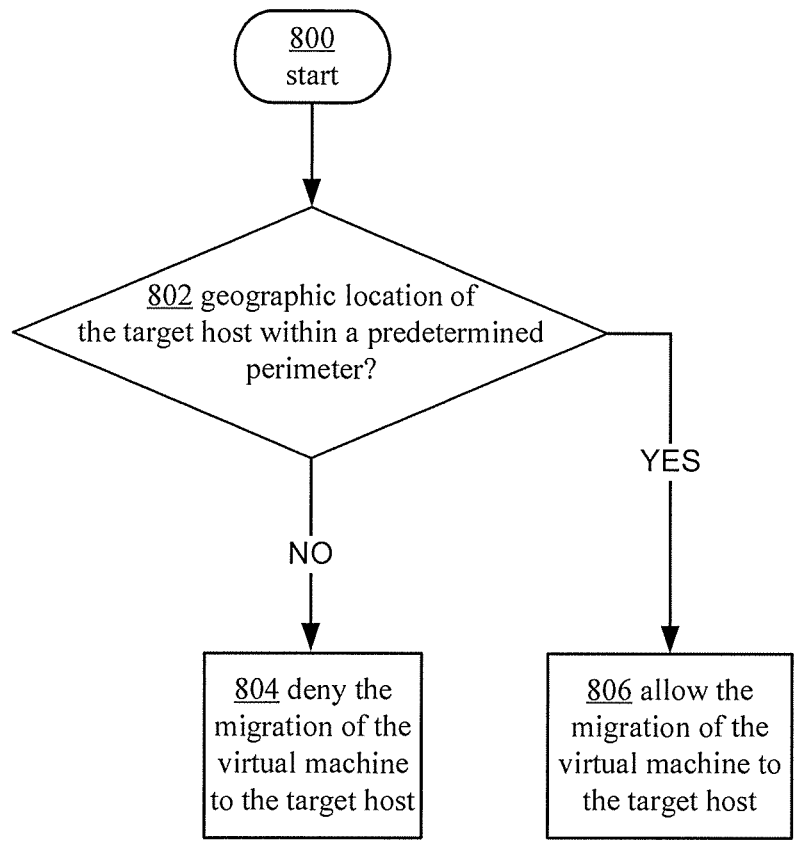
FIG. 8 illustrates an example of an operational procedure for migrating virtual machines.

FIG. 8 illustrates an example of an operational procedure for migrating virtual machines including operations 800, 802, 804, and 806. Referring to FIG. 8, operation 800 begins the operational procedure. Operation 800 may be followed by operation 802. Operation 802 (geographic location of the target host within a predetermined perimeter?) illustrates, in response to receiving a request to migrate a virtual machine from a source host to a destination host, determining, by a computing device, whether a geographic location of the target host is within a predetermined perimeter. In one embodiment, the determination can be made based on location information received from a positioning service using one of the methods described herein.

Operation 802 may be followed by operation 804. Operation 804 (deny the migration of the virtual machine to the target host) illustrates, based on the determining, denying, by the computing device, the migration of the virtual machine to the target host. Otherwise, if it is determined that the geographic location of the target host is within the predetermined perimeter, then in some embodiments, operation 802 may be followed by operation 806. Operation 806 (allow the migration of the virtual machine to the target host) illustrates, based on the determining, allowing, by the computing device, the migration of the virtual machine to the target host.

In some embodiments, a hidden process configured to verify a hardware configuration of the target host may be executed. In one embodiment, the hidden process may be configured to communicate with a trusted platform module to receive information for verification of the hardware configuration. The hidden process may be incorporated in a kernel of the virtual machine as described herein. The hidden process may further comprise sending an alert indicating denial of the request.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Figure 9:
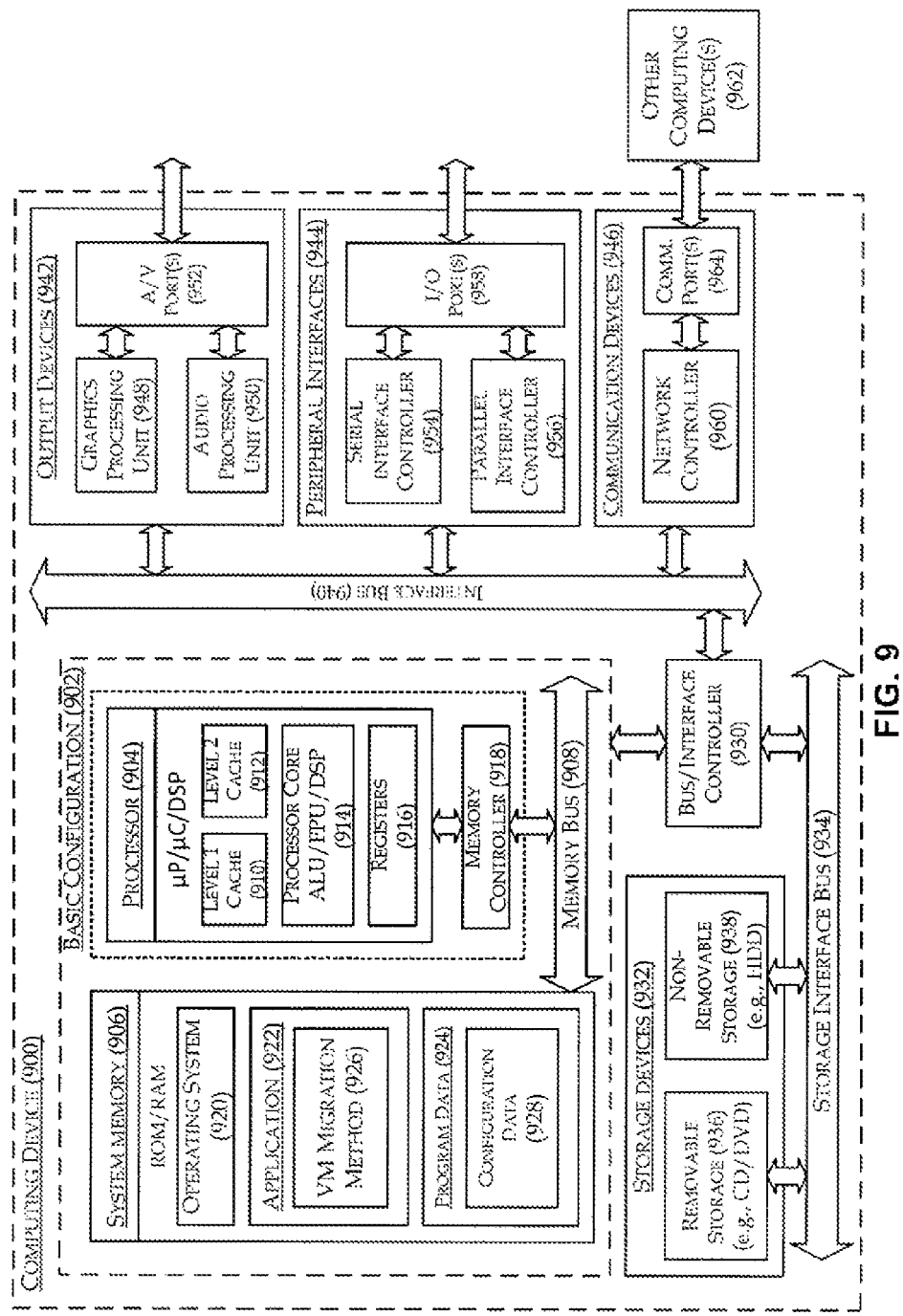
FIG. 9 depicts an example computing system wherein aspects of the present disclosure can be implemented.

FIG. 9 depicts an example computing system wherein aspects of the present disclosure can be implemented. In particular, FIG. 9 depicts a block diagram illustrating an example computing device 900 that is arranged for migrating a virtual machine in accordance with the present disclosure. In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one more levels of caching, such as a level one cache 910 and a level two cache 912, a processor core 914, and registers 916. An example processor core 914 may include an arithmetic logic unit (ALU), a floating point unit (FPU), a digital signal processing core (DSP Core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, one or more applications 922, and program data 924. Application 922 may include a virtual machine (VM) migration method 926 that is arranged to perform the functions as described herein including those described with respect to the processes described, for example, in FIGS. 6, 7 and 8. Program data 924 may include configuration data 928 that may be useful for operation with the virtual machine migration method described above. In some embodiments, application 922 may be arranged to operate with program data 924 on operating system 920 such that that implementations of virtual machine migration may be provided as described herein. This described basic configuration 902 is illustrated in FIG. 9 by those components within the inner dashed line.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output devices 942 include a graphics processing unit 948 and an audio processing unit 950, which may be configured to communicate to various external devices such as a display or speakers via one or more A/V ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method to migrate a virtual machine, the method comprising:
   receiving, at a computing device, a request to migrate a virtual machine from a source host to a target host;
   determining whether a geographic location of the target host is within a predetermined perimeter, wherein the geographic location is determined using a hidden process comprising a virtual machine kernel level process running on the computing device;
   determining whether the virtual machine is running on a verified hardware configuration;
   in response to a determination that the target host is within the predetermined perimeter, allowing migration of the virtual machine from the source host to the target host; and
   in response to a determination that the target host is outside of the predetermined perimeter and the virtual machine is not running on a verified hardware configuration, denying migration of the virtual machine from the source host to the target host and providing an alert regarding hijacking, theft, or both of the virtual machine using the hidden process.

2. The method of claim 1, wherein the determining is based on location information received from a positioning service.

3. The method of claim 2, wherein the positioning service is a network based positioning service.

4. The method of claim 2, wherein the positioning service is a GPS based positioning service.

5. The method claim 1, wherein using the hidden process to alert the user or service provider host further comprises providing an approximate physical location of a platform running the virtual machine.

6. The method of claim 5, wherein the approximate physical location is provided by positioning hardware and/or a positioning service.

7. A computing system comprising:
   a computing device comprising at least one processor;
   a memory communicatively coupled to the processor when the system is operational, the memory having stored therein computer instructions that upon execution by the at least one processor cause:
   execution of a hidden process comprising a virtual machine level kernel configured to execute on the computing device that is configured to verify hardware configuration of a target host;

in response to a request to migrate a virtual machine from a source host to the target host, determine whether a geographic location of the target host is within a predetermined perimeter;

in response to a determination that the target host is within the predetermined perimeter, allow migration of the virtual machine from the source host to the target host; and in response to a determination that the target host is outside of the predetermined perimeter and the virtual machine is not running on a verified hardware configuration, deny migration of the virtual machine from the source host to the target host and provide an alert regarding hijacking, theft, or both of the virtual machine using the hidden process.

8. The computing system of claim 7, wherein the hidden process is configured to communicate with a trusted platform module to receive information for verification of the hardware configuration.

9. The computing system of claim 8, wherein the information comprises a hash of an operating system and a private key.

10. The computing system of claim 7, wherein the geographic location is determined based on information received from a network device.

11. The computing system of claim 7, wherein the geographic location is determined based on information provided by a geolocation device.

12. The computing system of claim 7, wherein the alert includes an indication of the geographic location.

13. The computing system of claim 7, wherein the determining comprises searching for network devices connected to the target host and determining the geographic location by tracing IP addresses.

14. A non-transitory computer readable storage medium storing thereon computer executable instructions to migrate a virtual machine, the computer executable instructions comprising:

determining whether a geographic location of a target host is within a predetermined perimeter in response to receiving a request to migrate a virtual machine from a source host to a target host;

determining whether the virtual machine is running on a verified hardware configuration;

in response to a determination that the target host is within the predetermined perimeter, allowing migration of the virtual machine to the target host; and in response to a determination that the target host is outside of the predetermined perimeter and that the virtual machine is not running on a verified hardware configuration, denying the migration of the virtual machine to the target host and providing an alert regarding hijacking, theft, or both of the virtual machine using the hidden process running on a computing device.

15. The computer readable storage medium of claim 14, further comprising computer executable instructions for executing a hidden process configured to verify a hardware configuration of the target host.

16. The computer readable storage medium of claim 15, wherein the hidden process is configured to communicate with a trusted platform module to receive information for verification of the hardware configuration.

17. The computer readable storage medium of claim 15, wherein the hidden process is incorporated in a kernel of the virtual machine.

18. The computer readable storage medium of claim 14, wherein the determining whether a geographic location of a target host is within a predetermined perimeter is based on location information received from a positioning service.

19. The computer readable storage medium of claim 14, further comprising computer executable instructions for sending an alert indicating denial of the request.

* * * * *

UNITED STATES PATENT AND TRADEMARK OFFICE
CERTIFICATE OF CORRECTION

| | | |
|---|---|---|
| PATENT NO. | : 9,054,917 B2 | Page 1 of 1 |
| APPLICATION NO. | : 13/520464 | |
| DATED | : June 9, 2015 | |
| INVENTOR(S) | : Khesin | |

It is certified that error appears in the above-identified patent and that said Letters Patent is hereby corrected as shown below:

In The Specification:

In Column 13, Line 40, delete "thereof An" and insert -- thereof. An --, therefor.

Signed and Sealed this
Ninth Day of August, 2016

Michelle K. Lee
*Director of the United States Patent and Trademark Office*